(12) United States Patent
Wilson et al.

(10) Patent No.: US 11,993,838 B2
(45) Date of Patent: May 28, 2024

(54) HEAT TREATMENT OF ADDITIVELY MANUFACTURED ALUMINUM ALLOY

(71) Applicant: The Boeing Company, Chicago, IL (US)

(72) Inventors: Paul N. Wilson, St. Louis, MO (US); Michael R. Zolnowski, St. Louis, MO (US); Russell W. Cochran, Maryland heights, MO (US); Burke L. Reichlinger, Kent, WA (US)

(73) Assignee: The Boeing Company, Chicago, IL (US)

( * ) Notice: Subject to any disclaimer, the term of this patent is extended or adjusted under 35 U.S.C. 154(b) by 404 days.

(21) Appl. No.: 16/659,498

(22) Filed: Oct. 21, 2019

(65) Prior Publication Data
US 2021/0115545 A1    Apr. 22, 2021

(51) Int. Cl.
| | | |
|---|---|---|
| *C22F 1/04* | (2006.01) | |
| *B23K 26/34* | (2014.01) | |
| *B23K 26/354* | (2014.01) | |
| *B33Y 10/00* | (2015.01) | |
| *B33Y 40/00* | (2020.01) | |

(52) U.S. Cl.
CPC ............... *C22F 1/04* (2013.01); *B23K 26/34* (2013.01); *B23K 26/354* (2015.10); *B33Y 40/00* (2014.12); *B33Y 10/00* (2014.12)

(58) Field of Classification Search
CPC ................................... C22F 1/04; B33Y 10/00
See application file for complete search history.

(56) References Cited

U.S. PATENT DOCUMENTS 10,260,136 B2 *   4/2019   Yoon ....................... C22F 1/043
2016/0138400 A1   5/2016   Karabin et al.

FOREIGN PATENT DOCUMENTS

| | | | |
|---|---|---|---|
| CN | 104630665 | A | 5/2015 |
| CN | 105734470 | A | 7/2016 |
| CN | 107803503 | A | 3/2018 |
| CN | 107881385 | A | 4/2018 |
| WO | WO 2019/090398 | A1 | 5/2019 |
| WO | WO-2019090398 | A1 * | 5/2019 |
| WO | WO 2019/165136 | A1 | 8/2019 |
| WO | WO-2019165136 | A1 * | 8/2019 |

OTHER PUBLICATIONS

Cabiran, Aluminum Alloy Mechanical Properties Specifications Rev. 2017, https://www.cabiran.com/cwsd.php?Z3AuPTQ0MQ/NDA/ZWImYm1rb3BjRWI-YHoicXd1.pdf, 2017 (Year: 2017).*

(Continued)

*Primary Examiner* — Anthony M Liang
*Assistant Examiner* — Jacob J Gusewelle
(74) *Attorney, Agent, or Firm* — Haynes and Boone, LLP

(57) ABSTRACT

A method for heat treating an additively manufactured A205 aluminum alloy component ("AM205 component") to produce a uniform grain distribution within the AM205 component is disclosed. The method includes solution aging the AM205 component at a first temperature for a first time period, wherein the first time period is less than five hours and overaging the AM205 component after the solution aging.

29 Claims, 11 Drawing Sheets

(56) References Cited

OTHER PUBLICATIONS

F. Alghamdi, D. Verma, M. Haghshenas, Small-Scale Characterization of Additively Manufactured Aluminum Alloys through Depth-Sensing Indentation, 2018, https://repositories.lib.utexas.edu/handle/2152/90203, University of Texas Libraries (Year: 2018).*

Anonymous: "Aluminum Alloy Heat Treatment Temper Designations," Jan. 28, 2016, XP055783918, retrieved from the Internet: URL:https://web.archive.org/web/20160128234605/http://www.matweb.com/reference/aluminumtemper.aspx [retrieved on Mar. 10, 2021].

Li et al.: Effects of the two-step ageing treatment on the microstructure and properties of 7B04 alloy pre-stretched thick plates, Rare Metals—Xiyou Jinshu, Press of Metallurgical Industry, Beijing, CN, vol. 26, No. 3, Jun. 1, 2007, pp. 193-199, XP022934919, ISSN: 1001-0521, DOI: 10.1016/S1001-0521(07)60200-9 [retrieved on Jun. 1, 2007].

* cited by examiner

602

604

HEAT TREATMENT OF ADDITIVELY MANUFACTURED ALUMINUM ALLOY

BACKGROUND

1. Technical Field

The disclosure relates generally to additive manufacturing and, more particularly, to heat treatment for an aluminum alloy used in additive manufacturing.

2. Related Art

Additive manufacturing, also known as three-dimensional (3D) printing, is a deposition process of building a 3D object from a computer-aided design model, usually by successively adding material layer by layer. The material is usually a liquid or a powder that is joined to create a 3D object. At present, 3D printing has advanced to the use of metals where metal 3D printing has allowed the fabrication of metal components from metal powders that would not have been possible prior without this technology. Moreover, metal 3D printing is a less wasteful process than tradition metal manufacturing and typically the resulting 3D printed metal part is lighter than the same part that is traditionally manufactured. These properties have caused an increased use of metal 3D parts in many industries including the aviation industry.

At present many metal 3D printing processes utilize a combination of a power-bed system with an energy source to join the material, which is usually a powdered metal. The energy source is typically one or more lasers, heated nozzles, energy beams, etc. In the case of a laser and metal powder, a metal 3D printing process may include utilizing one or more lasers to melt and recombine the metal powder into the 3D metal part in an additive process that includes adding (layer by layer) the melted powdered material until the 3D metal part is formed.

Moreover, aluminum has become an important metal for 3D printing because aluminum is a metal that has good strength-to-weight ratio, high thermal and electrical conductivity, low density and natural weather resistance which is good for functional parts that have high strength, stiffness, low weight, and high accuracy. An A205 aluminum alloy is an example of a powdered version of aluminum alloy powdered material that is utilized as a cast material or as a base material in an additive manufacturing process (i.e., 3D printing process). If utilized in additive manufacturing, the A205 aluminum alloy is known as AM205 aluminum alloy (or simply as AM205 aluminum or just AM205).

Generally, the heat treatment of AM205 aluminum alloy is utilized after the additive manufacturing process (i.e., the deposition process) has fabricated an AM205 aluminum alloy part to attempt to improve the mechanical properties of the AM205 aluminum alloy part. This heat treatment is usually the same type of heat treatment that is typically applied to a cast A205 aluminum alloy part. Unfortunately, AM205 aluminum alloy responds differently than a cast A205 aluminum alloy part. The AM205 aluminum alloy responds in a way that is unusual to heat treatment after the deposition process such that standard heat treatment practices utilized with cast A205 aluminum alloy parts are not useful for optimizing AM205 aluminum alloy part. As such, there is a need for a new system and method that addresses this problem.

SUMMARY

A method for heat treating an additively manufactured A205 aluminum alloy component ("AM205 component") to produce a uniform grain distribution within the AM205 component is disclosed. The method includes solution aging the AM205 component at a first temperature for a first time period, wherein the first time period is less than five hours and overaging the AM205 component after the solution aging. Also described is an additively manufactured A205 aluminum alloy part ("AM205 part") with a uniform grain distribution. The AM205 part is made by a process comprising: additively manufacturing an additively manufactured A205 aluminum alloy component ("AM205 component") utilizing A205 aluminum alloy; solution aging the AM205 component at a first temperature for a first time period, wherein the first time period is less than five hours; and overaging the AM205 component after the solution aging to produce the AM205 part with the uniform grain distribution.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

Moreover, other devices, apparatus, systems, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE FIGURES

The disclosure may be better understood by referring to the following figures. The components in the figures are not necessarily to scale, emphasis instead being placed upon illustrating the principles of the disclosure. In the figures, like reference numerals designate corresponding parts throughout the different views.

DETAILED DESCRIPTION

Various systems and techniques are described herein for heat treating an AM205 aluminum alloy (generally referred to in this disclosure as "AM205 aluminum" though it is appreciated by those of ordinary skill in the art that the material is an aluminum alloy and not pure aluminum) after additive manufacturing. As discussed earlier, additive manufacturing, also known as three-dimensional ("3D") printing, is a deposition process of building a 3D object from a computer-aided design model, usually by successively adding material layer by layer. The material is usually a liquid or a powder that is joined to create a 3D object. In this disclosure, the material is A205 aluminum alloy (generally referred to in this disclosure as "A205 aluminum") in a powdered form. As an example, the A205 aluminum may be provided in a powdered form by Aeromet International Limited® of Worcester, England, UK. The powdered A205 aluminum is then used in additive manufacturing to create a solid 3D object of additively manufactured A205 aluminum alloy component ("AM205 component" where the "AM" designates that the A205 aluminum was utilized in an additive manufacturing process). In general, as deposited AM205 aluminum includes a yield strength of approximately 38.5 thousands of pounds per square inch ("ksi") and an ultimate tensile strength of approximately 49.2 ksi with a 20% elongation at failure. Generally, in order to complete the process of producing an AM205 part from the AM205 component, a heat treatment technique is applied to the AM205 component. As an example, the typical heat treatment technique for AM205 aluminum recommended by Aeromet International Limited® is a standard T7 aluminum heat treatment. This technique includes an initial lengthy solution treatment (e.g., a solution treatment of between eight to twenty-four hours) followed by aging at an elevated temperature ("overaging"). However, while such a technique increases the ultimate strength of the AM205 aluminum component, it does not significantly increase yield strength. Alternatively, other standard heat treatment techniques increased the yield strength, but not the ultimate strength of the AM205 aluminum component. All of the standard heat treatment techniques resulted in the AM205 aluminum component being inferior to a cast A205 aluminum component (with a yield strength of 59 ksi and an ultimate tensile strength of 66 ksi) in performance from a strength point of view.

As such, the present disclosure describes heat treatment techniques specifically developed for AM205 aluminum. The heat treatment techniques described herein allow for additively manufactured AM205 aluminum to match or substantially match the performance of cast A205 aluminum. These techniques include an initial solution aging step for a shorter length of time (e.g., four hours) as well as possible additional aging steps.

Figure 1A:
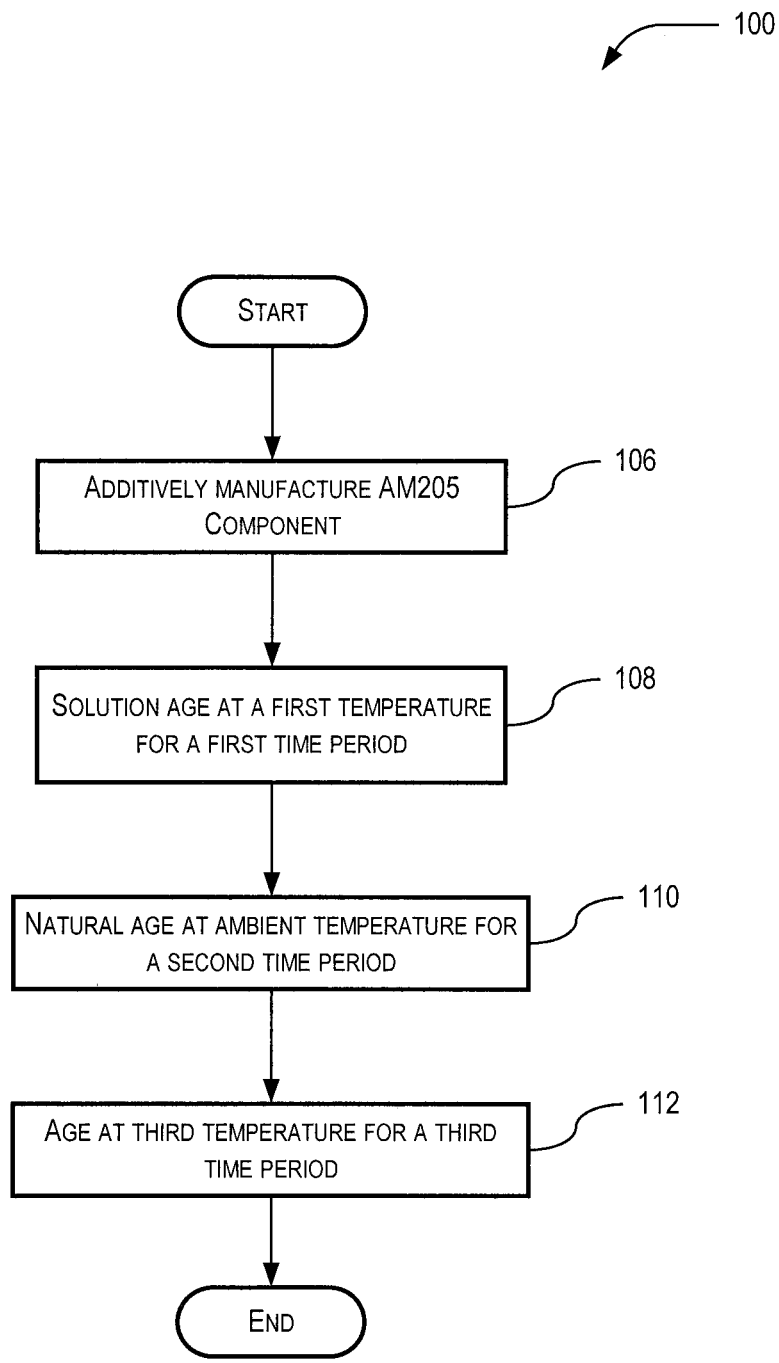
FIG. 1A is a flowchart of an example of an implementation of a method for heat treating an AM205 aluminum alloy in accordance with the present disclosure.
Figure 1B:
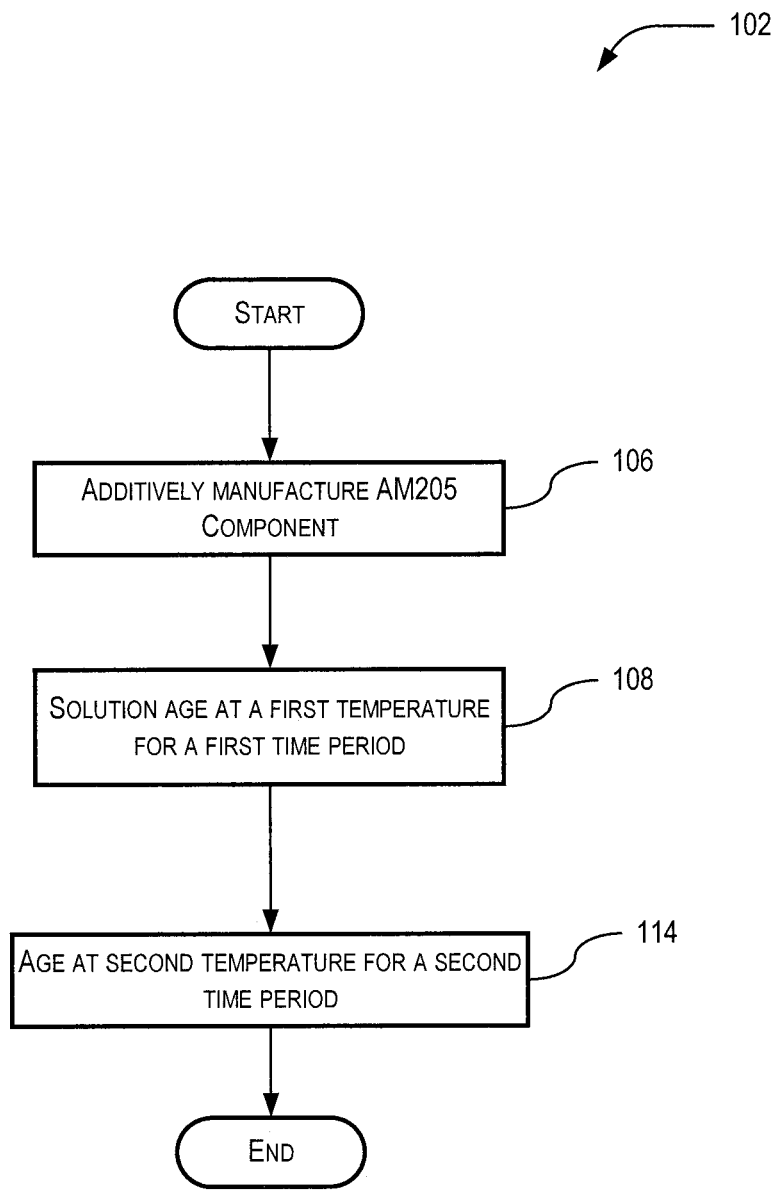
FIG. 1B is a flowchart of an example of an implementation of another method for heat treating the AM205 aluminum alloy in accordance with the present disclosure.
Figure 1C:
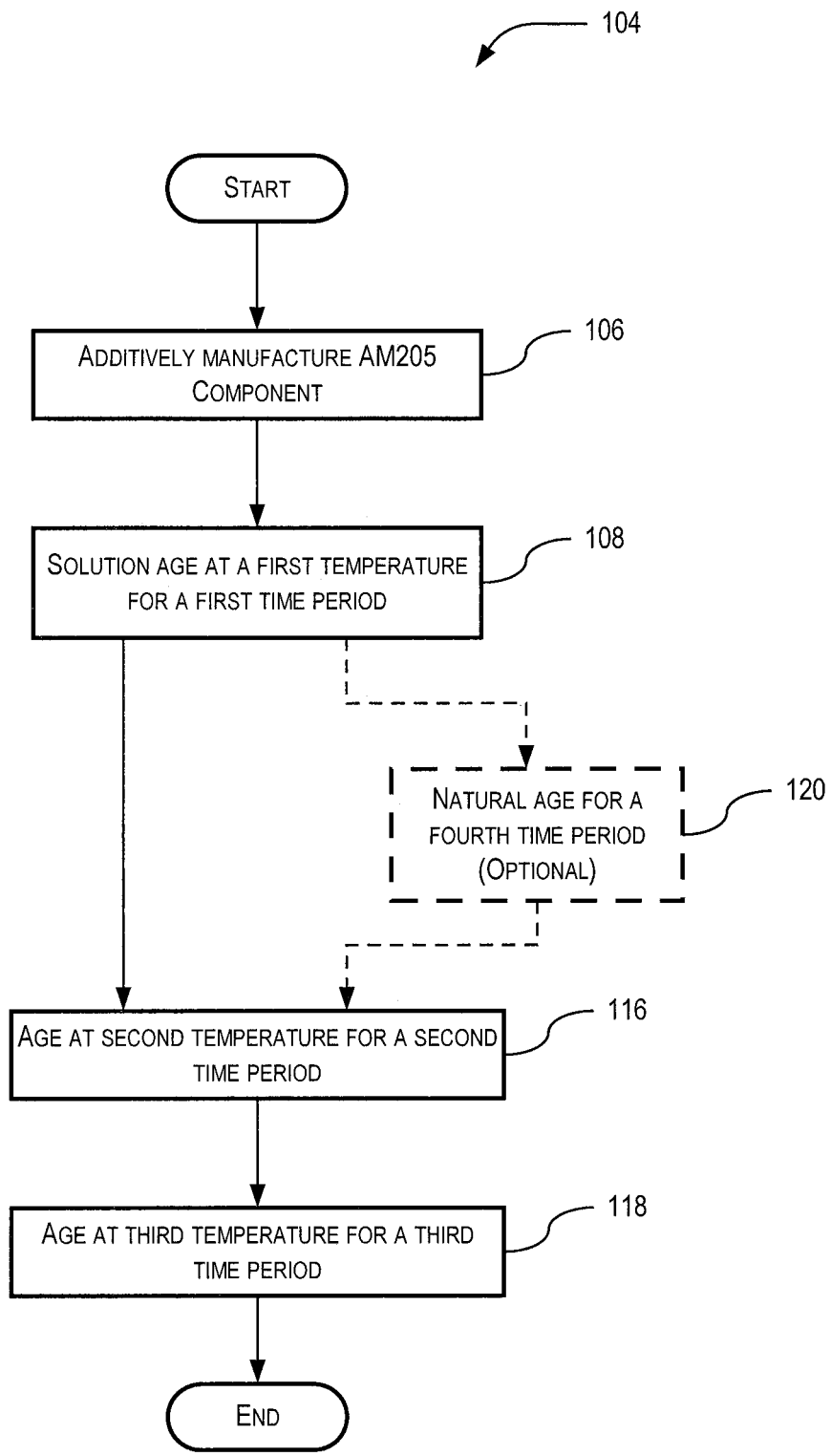
FIG. 1C is a flowchart of an example of an implementation of yet another method for heat treating the AM205 aluminum alloy in accordance with the present disclosure.

In general, the present disclosure discloses a method for heat treating an additively manufactured A205 aluminum alloy component ("aluminum alloy component" or "AM205 component") to produce a uniform grain distribution within the AM205 component. The method includes solution aging the AM205 component at a first temperature for a first time period, wherein the first time period is less than five hours and overaging the AM205 component after the solution aging. FIGS. 1A-C described the techniques in further detail.

Also described is an additively manufactured A205 aluminum alloy part ("aluminum alloy part" or "AM205 part") with a uniform grain distribution. The AM205 part is made by a process comprising: additively manufacturing an additively manufactured A205 aluminum alloy component ("AM205 component") utilizing A205 aluminum alloy; solution aging the AM205 component at a first temperature for a first time period, wherein the first time period is less than five hours; and overaging the AM205 component after the solution aging to produce the AM205 part with the uniform grain distribution.

In FIG. 1A, a flowchart of an example of an implementation of a method 100 for heat treating an AM205 aluminum is shown in accordance with the present disclosure. FIG. 1B is a flowchart of an example of an implementation of another method 102 for heat treating the AM205 aluminum in accordance with the present disclosure. In FIG. 1C, a flowchart of an example of an implementation of yet another method 104 for heat treating the AM205 aluminum is shown in accordance with the present disclosure. In general, FIGS. 1A-C are flowcharts that detail the heat treatment techniques for the AM205 aluminum with three different variations of heat treatment techniques for additively manufactured AM205 aluminum.

Turning to FIG. 1A, the method 100 starts by additively manufacturing 106 the AM205 component from A205 aluminum powder. As discussed earlier, additive manufacturing 106 step is a deposition process of fabricating the AM205 component as a 3D object from a computer-aided design model, usually by successively adding A205 aluminum powder that is melted by a high energy source (such as one or more lasers or electron beams) layer by layer. Once fabricated, the AM205 component is then solution aged 108 at a first temperature for a first time period.

The Solution aging 108 step may involve keeping the AM205 component in a liquid where the liquid may be heated to an elevated first temperature, such as a temperature of between 400 to 700 degrees Celsius (for example at approximately 540 degrees Celsius). Additionally, the AM205 component may be solution aged 108 for a first time period, such as a time period of four (4) hours or less (for example, approximately four (4) hours, where approximately may be about +/−5% of the value such that the first time period may be between three (3) hours and 45 minutes and four (4) hours and 15 minutes). In this example, the solution aging 108 of AM205 component may result in grain growth within the AM205 component.

For reference, it is appreciated by those of ordinary skill in the art that the solution aging 108 step for the first time period in this example is less than the time that AM205 components are typically solution aged during T7 heat treating. A shorter solution aging time than that of T7 heat treating may result in reduced etching by the solution while dissolving copper rich phases within the material.

While a single step is shown in this example, it is noted that the solution aging 108 step may be instead a multi-step solution treatment. For example, the AM205 component may be solution aged for two (2) hours at an elevated temperature, returned to ambient, and then solution aged for another two (2) hours at the same or a different elevated temperature. In general, it is appreciated that ambient may be a temperature of the environment such as, for example, room temperature that may be approximately 20 degrees Celsius but may vary and be as high as approximately 52 degrees Celsius.

The method 100 then includes further heat treating steps after the solution aging 108 step. In this example, the next step of the method 100 includes natural aging 110 of the AM205 component for a second time period. Natural aging 110 may include holding the AM205 component a second temperature that is an ambient temperature (e.g., room temperature) for a second time period. In this example, the second time period may be longer than the first time period. For example, the second time period may be a period of between 12 to 36 hours. After natural aging 110, the AM205 component may be overaged 112 for a third time period at a third temperature. This overaging 112 step may include the exposure of the AM205 component to an environment that has a temperature greater than that of room ambient. Thus, for example, the overaging 112 step may include placing the AM205 component in an environment at a temperature of between 150 to 250 degrees Celsius (for example at 190 degrees Celsius or between 170 and 210 degrees Celsius) for between two (2) to 36 hours (for example, five (5) hours or between four (4) hours to six (6) hours). In this example, the overaging 112 step may affect (for example, increase) the hardness of the 05 component. The method 100 then ends.

With regards to the methods 102 and 104 described in relation to FIGS. 1B and 1C, the first two steps 106 and 108 shown in FIG. 1A and described above are repeated in both methods 102 and 104.

Turning to FIG. 1B, the method 102 starts and includes the additive manufacturing 106 step and solution aging 108 step described previously in relation to FIG. 1A. However, in this example, the method 102 includes an overaging 114 step after the solution aging 108 step. The overaging 114 step may be similar to the overaging 112 step shown in FIG. 1A and described earlier; however, in this example the overaging 114 step may include overaging 114 for a fourth temperature and the fourth time period that may be different from the third temperature and the third time period described earlier in relation to overaging 112 step described in relation to FIG. 1A. In this example, the fourth temperature may be between 150 and 290 degrees Celsius (for example, 170 degrees Celsius) and the fourth time period may be may be between 12 and 28 hours, for example, between 12 to 20 hours, 20 to 28 hours, or 24 hours. The method 102 then ends.

Turning to FIG. 1C, similar to methods 100 and 102, the method 104 starts and includes the additive manufacturing 106 step and solution aging 108 step described previously in relation to FIG. 1A. In this example, the method 104 utilizes two different overaging steps 116 and 118. After solution aging 108, the method 104 includes overaging 116 at a fifth temperature for a fifth time period and then overaging 118 for sixth temperature and a sixth time period. In this example, the fifth and sixth temperatures of the overaging steps 116 and 118, respectively, may be the same temperature or may be different temperatures. Likewise, the first and sixth time periods of the overaging steps 116 and 118, respectively, may also be the same duration or different durations. As an example, the fifth temperature may be between 170 and 210 degrees Celsius (e.g., 170 degrees Celsius), the sixth temperature may be 190 degrees Celsius, the fifth time period may be between three (3) to 16 hours long (for example, three (3) to five (5) hours), and the sixth time period may be approximately four (4) hours long. The method 104 then ends.

In another example, the method 104 may include an optional natural aging 120 step between the solution aging 108 and overaging 116 steps. In this example, the optional natural aging 120 step is gap in the multi-step aging process. Specifically, the optional natural aging 120 step is a natural aging gap similar to the natural aging 110 step described in relation to FIG. 1A. In this example, the optional natural aging 120 step includes natural aging the AM205 component for a seventh time period. Similar to the natural aging 110 step described in relation to FIG. 1A, natural aging 120 may include holding the AM205 component a seventh temperature that is an ambient temperature for a seventh time period. Similar to the example described in relation to FIG. 1A, in this example, the seventh time period may be longer than the first time period. For example, the seventh time period may be a period of between 12 to 36 hours. As such, in this examples of method 104, the environment may be changed from the fifth temperature to the sixth temperature and the AM205 component may be moved between the different heat treating chambers or may remain in place.

It is noted that the previous description for method 104 described the that the fifth temperature of the first overaging 116 step is lower than the sixth temperature of the second overaging 118 step; however, it is appreciated that the method 104 may also include other situations where the first overaging 116 step is at a higher temperature than the second overaging 118 step. Likewise, while the example of the method 104 has also been described as the first overaging being longer than the second overaging, other examples may include a first overaging 116 step that is shorter than the second overaging 118 step. Additionally, other examples may include three or more overaging steps, each step conducted at a same or different temperature from one of the first or second overaging 116 or 118 steps or a same or different duration as that of one of the first or second overaging 116 or 118 steps.

It is appreciated that the values discussed for FIGS. 1A-C are example values for illustrative purposes only. Other examples may include processes performed at different temperature values and for different durations.

Figure 2:
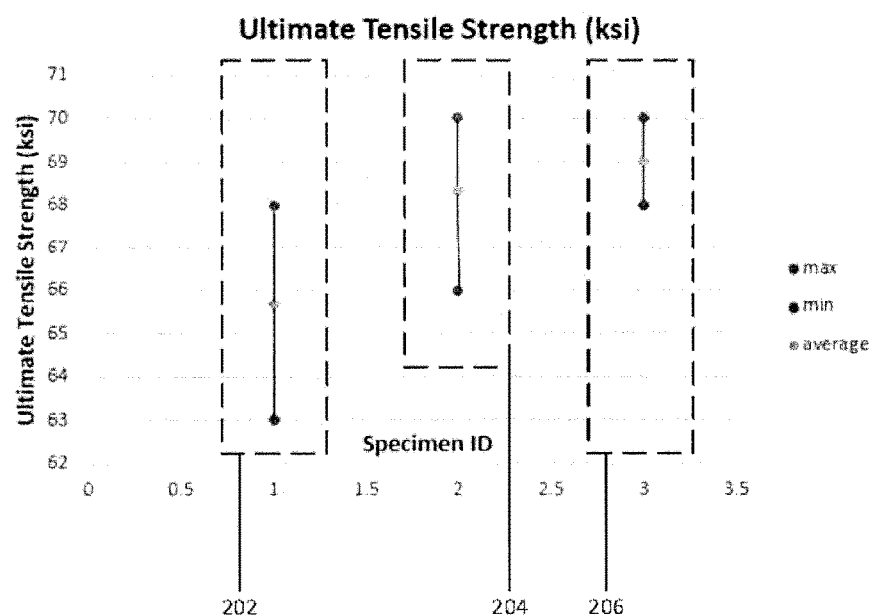
FIG. 2 is a graph of the ultimate tensile strength of an example of an implementation of AM205 aluminum components treated according to the techniques of FIGS. 1A-C in accordance with the present disclosure.
Figure 3:
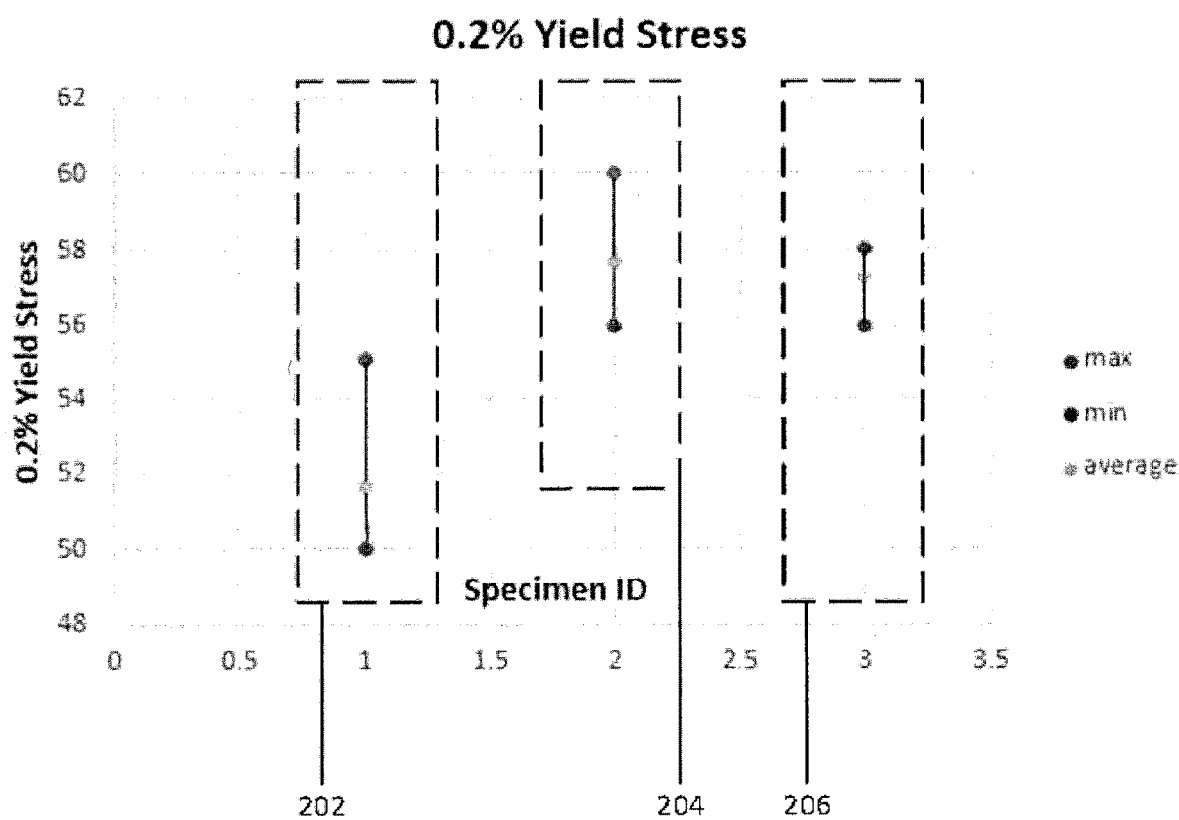
FIG. 3 is a graph of the yield stress of an example of an implementation of the AM205 aluminum components treated according to the techniques of FIGS. 1A-C in accordance with the present disclosure.
Figure 4:
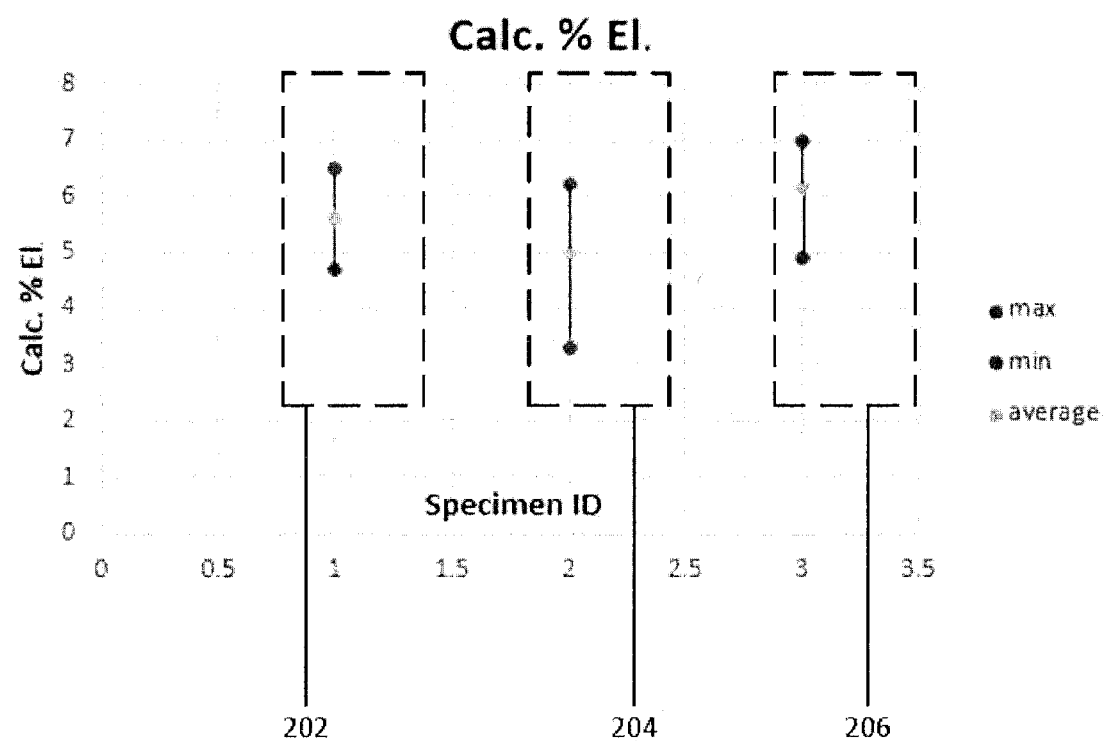
FIG. 4 is a graph of the calculate percentage elongation of an example of an implementation of the AM205 aluminum components treated according to the techniques of FIGS. 1A-C in accordance with the present disclosure.

Turning to FIG. 2, a graph is shown of the ultimate tensile strength of an example of an implementation of AM205 aluminum components treated according to the techniques of FIGS. 1A-C in accordance with the present disclosure. In FIG. 3, a graph is shown of the yield stress of an example of an implementation of the AM205 aluminum components treated according to the techniques of FIGS. 1A-C in accordance with the present disclosure. FIG. 4 is a graph of the calculate percentage elongation of an example of an implementation of the AM205 aluminum components treated according to the techniques of FIGS. 1A-C in accordance with the present disclosure. In general, FIGS. 2-4 are graphs showing properties of AM205 aluminum components that have been heat treated according to the techniques of FIGS. 1A-C.

The properties of the AM205 aluminum components heat treated according to a version of the method 100 of FIG. 1A is shown in box 202. As an example, the heat treatment may include solution aging 108 at 540 degrees Celsius for 4 hours, natural aging 110 for 24 hours, and overaging 112 at 190 degrees Celsius for five (5) hours. The properties of the AM205 aluminum components heat treated according to a version of the method 102 of FIG. 1B is shown in box 204. As an example, the heat treatment may include solution aging 108 at 540 degrees Celsius for 4 hours and overaging 114 at 170 degrees Celsius for 24 hours. The properties of the AM205 aluminum components heat treated according to a version of the method 104 of FIG. 1C is shown in box 206. As an example, the heat treatment may include solution aging 108 at 540 degrees Celsius for 4 hours, first overaging 116 at 170 degrees Celsius for 16 hours, and second overaging 118 at 190 degrees Celsius for four (4) hours.

In general, FIGS. 2-4 show measured minimum, average, and maximum values for the properties tested. FIG. 2 details ultimate tensile strength of the materials (i.e., AM205 aluminum components) after heat treating by the processes of FIGS. 1A-C. FIG. 3 details 0.2% elongation yield strength of the materials after heat treating by the processes of FIGS. 1A-C. FIG. 4 details percent elongation of materials after heat treating by the processes of FIGS. 1A-C.

As shown in FIGS. 2-4, the properties of the AM205 aluminum components are broadly similar, though the material heat treated by the process (i.e., method 104) of FIG. 1C has the highest average ultimate strength and the material heat treated by the process (i.e., method 102) of FIG. 1B has the highest average yield strength. The properties shown are similar to that of cast A205 aluminum alloy. In these examples, the ultimate tensile strengths of two of the techniques actually exceed that of cast A205 aluminum alloy.

FIGS. 5 and 6 are microscopy photographs of various deposited and heat treated AM205 aluminum components and parts in accordance with the present disclosure. In this disclosure, the original additively manufactured A205 aluminum alloy component that is not heat treated is referred to as the AM205 component and the heat treated AM205 component is referred to as an additively manufactured A205 aluminum alloy part ("AM205 part").

Figure 5A:
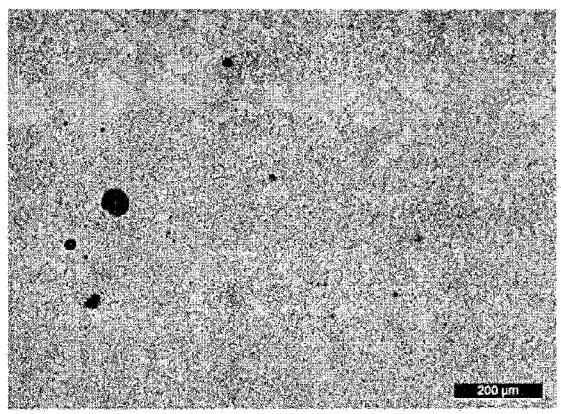
FIG. 5A is a microsopy photograph of microstructural compositions of a solution heat treated (solution aged) AM205 aluminum part and an as deposited non-treated AM205 aluminum component in accordance with the present disclosure.
Figure 5A:
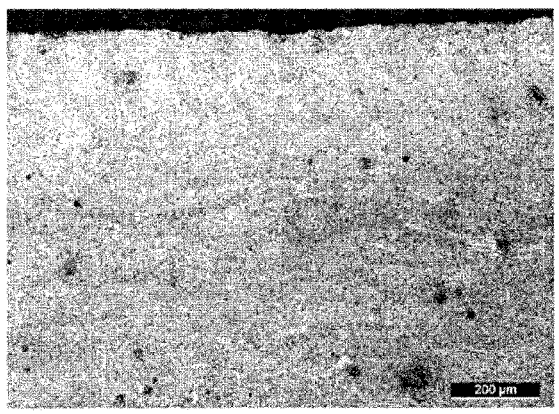
Figure 5B:
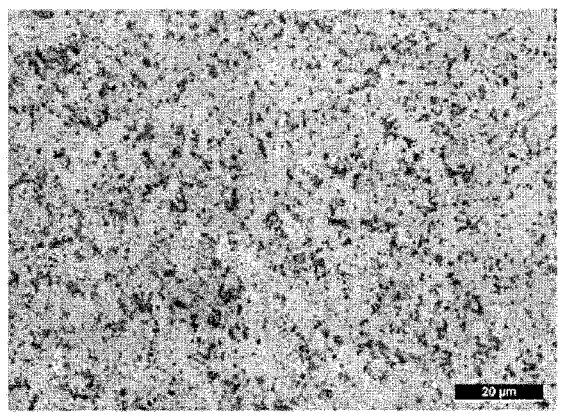
FIG. 5B is another microsopy photograph of microstructural compositions of a solution heat treated (solution aged) AM205 aluminum part and an as deposited non-treated AM205 aluminum component in accordance with the present disclosure.
Figure 5B:
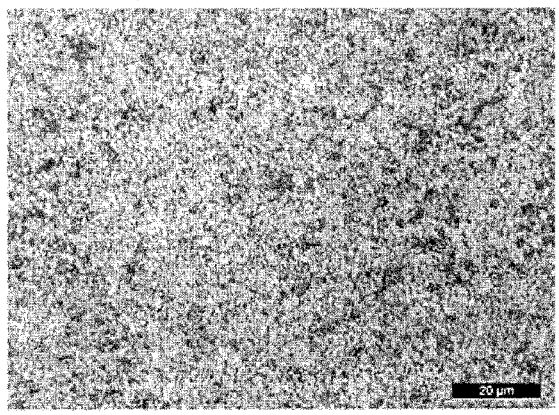

Turning to FIG. 5A, a microsopy photograph is shown of microstructural compositions of a solution heat treated (solution aged) AM205 aluminum part and an as deposited non-treated AM205 aluminum component in accordance with the present disclosure. In FIG. 5B, another microsopy photograph is shown of microstructural compositions of the solution heat treated (solution aged) AM205 aluminum part (in column 502) and the as deposited non-treated AM205 aluminum component (in column 504) in accordance with the present disclosure. FIGS. 5A and 5B are photographs at different levels of magnification. As shown in FIGS. 5A and 5B, the solution heat treated AM205 part shows significant grain growth.

Figure 6A:
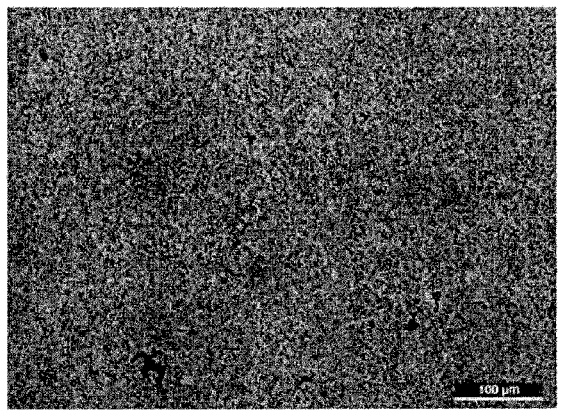
FIG. 6A shows photographs of microstructural compositions of a four (4) hour solution heat treated AM205 part and an eight (8) hour solution heat treated AM205 part in accordance with the present disclosure.
Figure 6A:
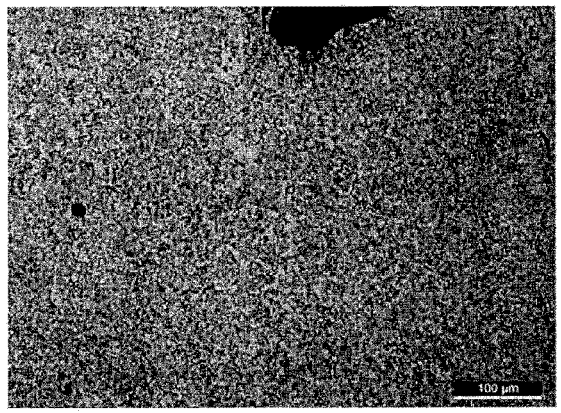
Figure 6B:
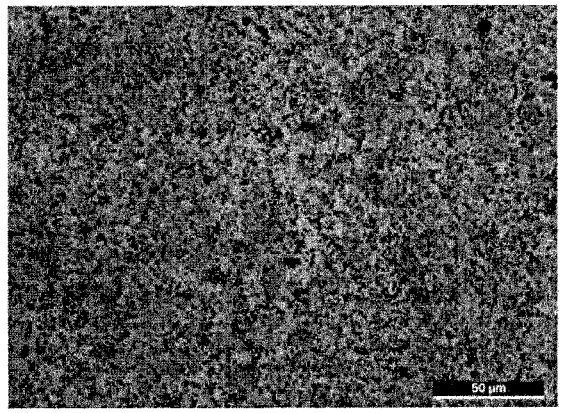
FIG. 6B shows additional photographs of the microstructural compositions of the four (4) hour solution heat treated AM205 part and the eight (8) hour solution heat treated AM205 part, shown in FIG. 6A, in accordance with the present disclosure.
Figure 6B:
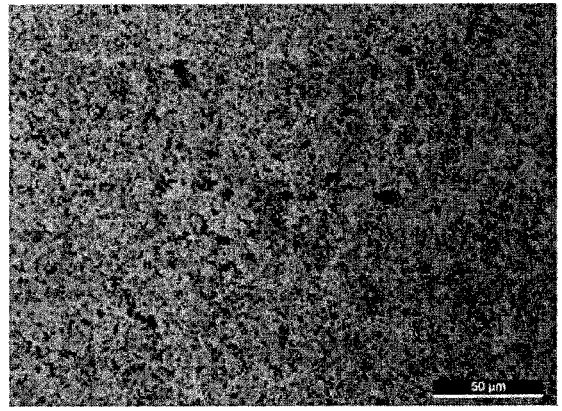

FIG. 6A shows photographs of microstructural compositions of a four (4) hour solution heat treated AM205 part, in column 602, and an eight (8) hour solution heat treated AM205 part, in column 604, in accordance with the present disclosure. FIG. 6B shows additional photographs of the microstructural compositions of the four (4) hour solution heat treated AM205 part, in column 602, and the eight (8) hour solution heat treated AM205 part, in column 604, in accordance with the present disclosure. In this example, FIGS. 6A and 6B are photographs at different levels of magnification. As shown in FIGS. 6A and 6B, the AM205 part that is solution heat treated for four (4) hours has a reduced amount of etching as compared to the AM205 part that is solution heat treated for eight (8) hours while still dissolving copper rich phases.

Figure 7:
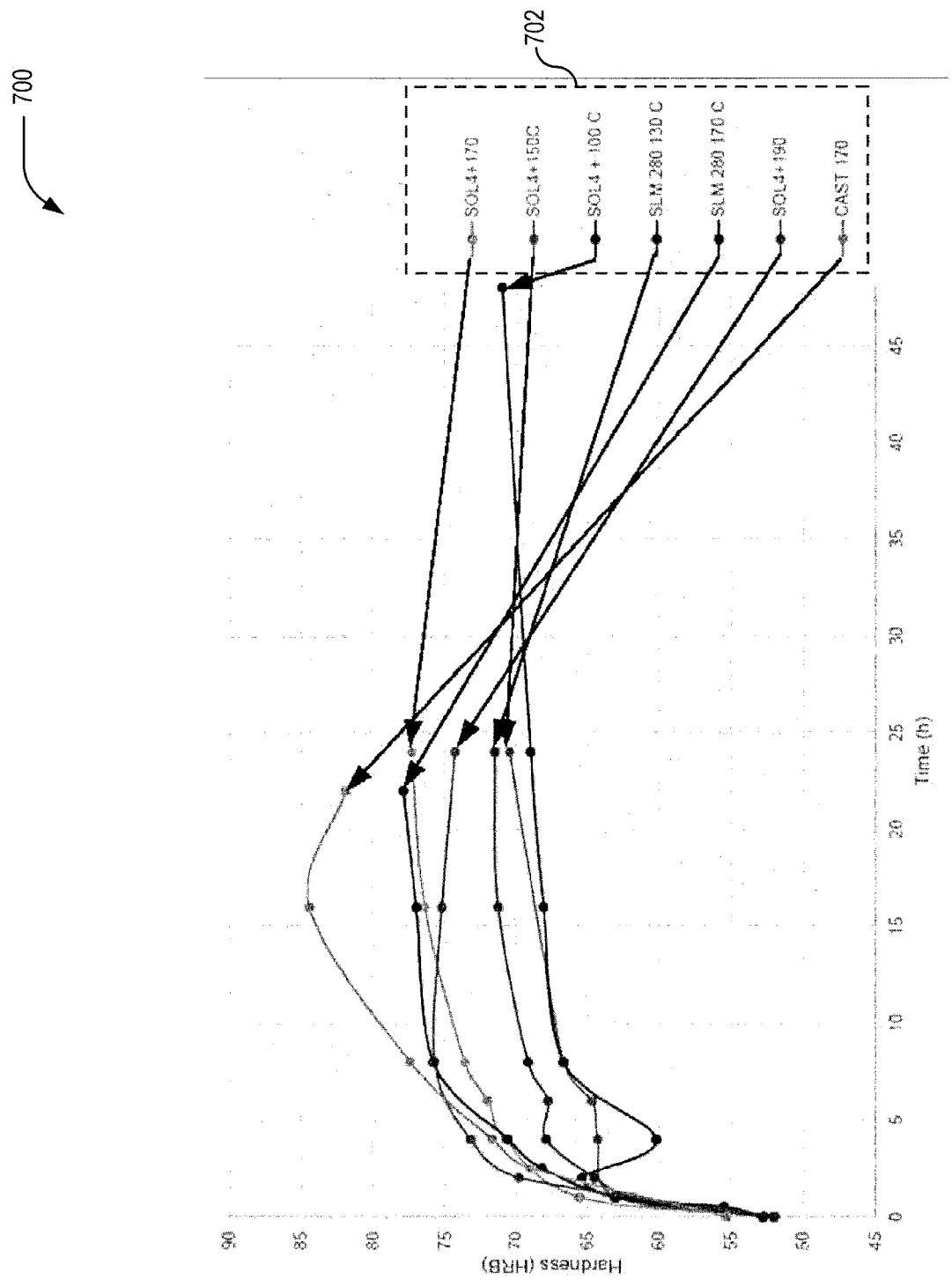
FIG. 7 is a graph of the hardness properties of various AM205 aluminum components treated according to the methods described in FIGS. 1A-C in accordance with the present disclosure.

Turning to FIG. 7, a graph 700 is shown of the hardness properties of various AM205 aluminum components treated according to the methods 100, 102, and 103 shown in FIGS. 1A-C in accordance with the present disclosure.

The various heat treatment properties are listed in the legend 702. In this example, "SOL" denotes solution heat treatment, "SLM" denotes selective laser melting, and "CAST" denotes a cast A205 part instead of additive manufactured part ("AM205 part"). Single digit numbers (e.g., within "SOL4") denote that solution heat treating was performed for that number of time (e.g., 4 hours). Three digit numbers shown by themselves (e.g., 150, 170, or 190) denote overaging at the temperature of the number.

Figure 8:
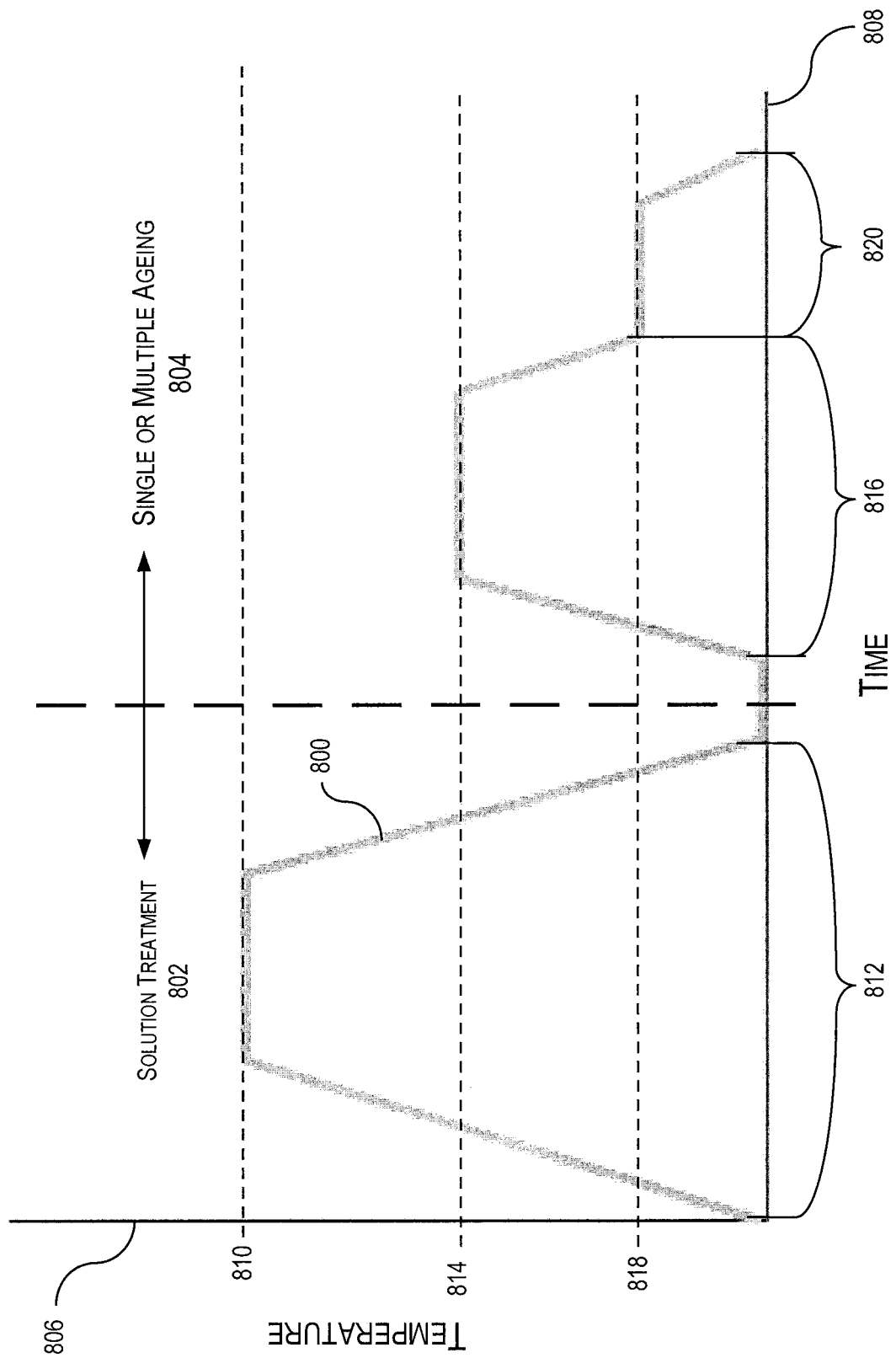
FIG. 8 is a graph of a plot of an example of an implementation of the methods described in FIGS. 1A-C in accordance with the present disclosure.

In FIG. 8, a graph of a plot 800 of an example of an implementation of the methods 100, 102, and 104 is shown in accordance with the present disclosure. The plot 800 illustrates the two aging stages (i.e., solution treatment 802 and single or multiple ageing 804 stages) performed by all three of the previously described methods 100, 102, and 104. The plot 800 is of temperature 806 versus time 808 and shows that the solution aging (i.e., solution treatment 802) of the AM205 component is at a first temperature 810 for a first time period 812 and the overaging (i.e., the single of multiple aging 804 stages) is at a second temperature 814 for a second time period 816. In this example, the method may include an optional third aging stage at a third temperature 818 for a third time period 820. For this plot 800, it is appreciated that the first temperature 810 of the solution treatment 802 is higher than the second temperature 814 or third temperature 818 of the single or multiple ageing 804 stages.

Figure 9:
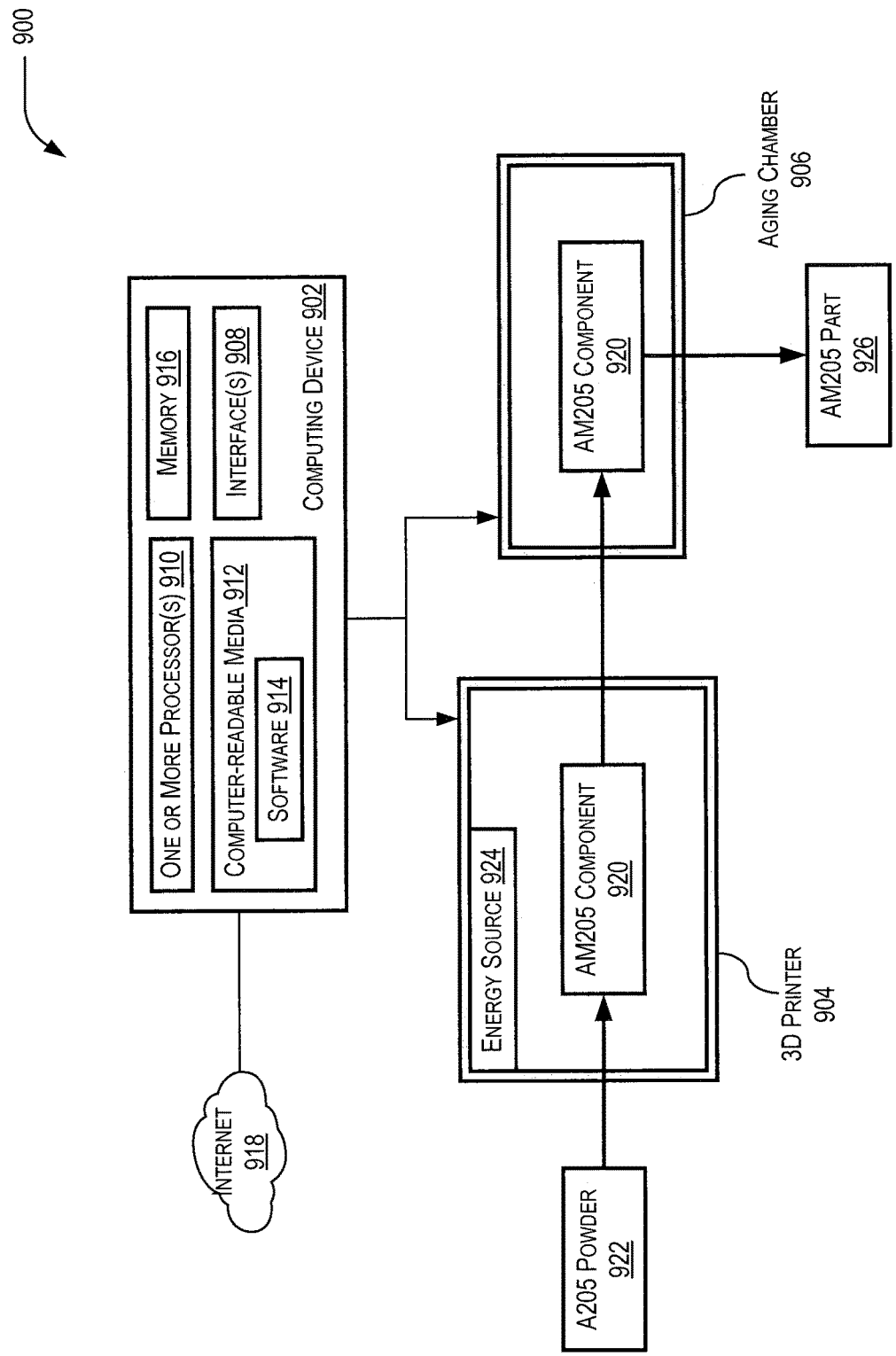
FIG. 9 is a system block diagram of an example of an implementation of system for performing the methods described in FIGS. 1A-C in accordance with the present disclosure.

In FIG. 9, a system block diagram is shown of an example of an implementation of system 900 for performing the methods 100, 102, and 104 described in relation to FIGS. 1A-C in accordance with the present disclosure. The system 900 may include a computing device 902, 3D Printer 904, and aging chamber 906.

The computing device 902 may be, for example, a personal computer (including a desktop, tower, or other similar devices), portable computer (including a laptop, notebook, or tablet computer, or other similar devices), mobile device (including a tablet, smartphone, or other similar devices), server, or other type of computing device capable of connecting to the 3D printer 904, aging chamber 906, and optionally other devices over the Internet, or other smart devices. In general, the computing device 902 is operated by an end-user (not shown).

In some implementations, the computing device 902 includes one or more input/output ("I/O") interfaces 908 that enable communications with the 3D printer 904, aging chamber 906, and input/output devices such as user input devices including peripheral input devices (e.g., a keyboard, a mouse, a pen, a voice input device, a touch input device, a gestural input device, and the like) and/or output devices including peripheral output devices (e.g., a display, a printer, audio speakers, and the like).

The computing device 902 may represent any type of computing device having one or more processing units 910 in signal communication to a computer-readable media 912 via a bus (not shown), which in some instances may include one or more of a system bus, a data bus, an address bus, a PCI bus, a Mini-PCI bus, and any variety of local, peripheral, and/or independent buses. Executable instructions stored on the computer-readable media 912 can include software 914 that includes, for example, an operating system, a client communication module, a profile module, and other modules, programs, or applications that are loadable and executable by the one or more processing units. The computing device 902 may also include one or more memory units 916 that may be utilized to store additional software, data, and/or utilized by the computer-readable media 912.

In this example, the one or more interface(s) 908 may include one or more network interface controllers ("NICs") or other types of transceiver devices to send and receive communications and/or data over the one or more networks that may include a local network utilized by the computing device 902, 3D printer 904, and aging chamber 906.

The computing device 902 may be in signal communication with the 3D printer 904, aging chamber 906, and optionally an external network such, for example, the Internet 918. It is appreciated by those skilled in the art that the circuits, components, modules, and/or devices of, or associated with, the computing device 902 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

Turning back the system 900, the system 900 is a system for heat treating an additively manufactured AM205 component 920 to produce a uniform grain distribution within the AM205 component. The system 900 includes the aging chamber 906 and the computing device 902 in signal communication with the aging chamber 906. The system 900 may also include the 3D printer 904. The computing device 902 includes the one or more processing units (i.e., processors) 910 and the computer-readable media 912 storing instructions that, when executed by the one or more processing units 910, cause the computing device 902 to perform a plurality of operations. These operations may include utilizing the aging chamber 906 to solution age the AM205 component 920 at a first temperature for a first time period and overage the AM205 component 920 after the solution aging. As an example, the first time period is less than five hours such as, for example, the first time period may be between three hours and 45 minutes and four hours and 15 minutes. Moreover, the first temperature may be between 530 and 550 degrees Celsius.

The computing device 902 may further perform an operation comprising natural aging the AM205 component 920 for a second time period after the solution aging and before the overaging. In this example, the second time period may be between 12 to 36 hours. Moreover, the overaging may be at a third temperature for a third time period, where the third temperature may be between 170 and 210 degrees Celsius and the third time period may be between four hours and six hours. Furthermore, the overaging is at a fourth temperature for a fourth time period, where the fourth temperature may be between 150 and 290 degrees Celsius and the fourth time period may be between 20 and 28 hours.

In general, the system 900 receives A205 powder 922 that is input into 3D printer 904. The 3D printer 904 includes an energy source 924 that may be one or more lasers or electron beams to melt the A205 powder 922 and produce the AM205 component 920 through a layer by layer additive manufacturing processes. The computing device 902 acts as a controller of the 3D printer to produce the AM205 component 920 from a data file located in the memory 916 of the computing device 902. Once produced, the AM205 component 920 may be removed from the 3D printer 904 and placed in the aging chamber 906 for aging based on the methods 100, 102, and 104 described earlier. Once the aging process is complete, the AM205 component 920 is removed from the aging chamber 906 as the AM205 part 924.

In this example, the 3D printer 904 and aging chamber 906 are shown as separate devices but it is appreciated that in some examples, the 3D printer 904 and aging chamber 906 may be configured to be the same device that first manufactures the AM205 component 920 and then ages it before producing the end product that is the AM205 part 926.

It will be understood that various aspects or details of the disclosure may be changed without departing from the scope of the disclosure. It is not exhaustive and does not limit the claimed disclosures to the precise form disclosed. Furthermore, the foregoing description is for the purpose of illustration only, and not for the purpose of limitation. Modifications and variations are possible in light of the above description or may be acquired from practicing the disclosure. The claims and their equivalents define the scope of the disclosure.

What is claimed is:

1. A method of heat treating an A205 aluminum alloy component additively manufactured from aluminum alloy powder, the method comprising:
   solution aging the A205 aluminum alloy component additively manufactured from aluminum alloy powder at a first temperature of 400 to 700 degrees Celsius for a first time period, wherein the first time period is between three hours and 45 minutes and four hours and 15 minutes;
   overaging the aluminum alloy component at a second temperature lower than the first temperature after the solution aging; and
   between the solution aging and the overaging, lowering a temperature of the A205 aluminum alloy component to a temperature below the second temperature;
   wherein the heat treating increases both a 0.2% yield stress and an ultimate tensile strength of the aluminum alloy component.

2. The method of claim 1, wherein after the heat treating, the aluminum alloy component has a 0.2% yield stress greater than 48 ksi and an ultimate tensile strength greater than 62 ksi.

3. The method of claim 2, wherein the first temperature is between 530 and 550 degrees Celsius, the 0.2% yield stress after the heat treating is less than 60 ksi, and the ultimate tensile strength after the heat treating is less than 71 ksi.

4. The method of claim 3, further comprising natural aging the aluminum alloy component for a second time period after the solution aging and before the overaging, wherein the second time period is between 12 to 36 hours.

5. The method of claim 4, wherein the second time period is 24 hours, the 0.2% yield stress is at least 52 ksi, and the ultimate tensile strength is at least 65 ksi.

6. The method of claim 4, wherein the overaging is at a third temperature for a third time period;
    wherein the third temperature is between 170 and 210 degrees Celsius, and
    wherein the third time period is between four hours and six hours.

7. The method of claim 2, wherein the overaging is at a fourth temperature for a fourth time period;
    wherein the fourth temperature is between 150 and 290 degrees Celsius, and
    wherein the fourth time period is between 20 and 28 hours.

8. The method of claim 7,
    wherein the overaging is a first overaging, and
    wherein the method further comprises a second overaging at a fifth temperature for a fifth time period after the first overaging;
    wherein the fourth temperature is between 150 and 190 degrees Celsius,
    wherein the fourth time period is between 12 and 20 hours,
    wherein the fifth temperature is between 170 and 210 degrees, and
    wherein the fifth time period is between three to five hours.

9. A method for heat treating an additively manufactured A205 aluminum alloy component, the method comprising:
    solution aging the A205 aluminum alloy component at 540 degrees Celsius for a first time period, wherein the first time period is between three hours and 45 minutes and four hours and 15 minutes;
    overaging the aluminum alloy component at a second temperature lower than the first temperature after the solution aging; and
    between the solution aging and the overaging, lowering a temperature of the A205 aluminum alloy component to a temperature below the second temperature;
    wherein the heat treating increases a 0.2% yield stress of the aluminum alloy component to a value greater than 48 ksi, and increases an ultimate tensile strength of the aluminum alloy component to a value greater than 62 ksi.

10. The method of claim 9, further comprising natural aging the aluminum alloy component for 24 hours after the solution aging and before the overaging, the 0.2% yield stress is at least 52 ksi and less than 62 ksi, and the ultimate tensile strength is at least 65 ksi and less than 71 ksi.

11. The method of claim 10, wherein the overaging is at 190 degrees Celsius.

12. The method of claim 11, wherein the overaging is for 5 hours.

13. The method of claim 11, wherein the overaging is for 4 hours.

14. The method of claim 11, wherein the overaging is a second overaging, and the method further comprises a first overaging after the solution aging and before the first overaging.

15. The method of claim 14, wherein the first overaging is at 170 degrees Celsius for 16 hours.

16. The method of claim 9, wherein the overaging is at 170 degrees Celsius for 24 hours.

17. An additively manufactured aluminum alloy part made by the method of claim 1.

18. The method of claim 1, wherein the method is performed by a system comprising:
    an aging chamber; and
    a computing device in signal communication with the aging chamber, the computing device comprising:
        one or more processing units;
        computer-readable media storing instructions that, when executed by the one or more processing units, cause the computing device to perform operations comprising:
            the solution aging the aluminum alloy component at the first temperature for the first time period, and
            the overaging the aluminum alloy component after the solution aging.

19. The method of claim 18, wherein the first temperature is between 530 and 550 degrees Celsius.

20. The method of claim 18, wherein the computing device further performs the operation comprising natural aging the aluminum alloy component for a second time period after the solution aging and before the overaging.

21. The method of claim 20, wherein the second time period is between 12 to 36 hours.

22. The method of claim 18,
    wherein the second temperature is between 170 and 210 degrees Celsius, and
    wherein the time period of the overaging is between four hours and six hours.

23. The method of claim 18,
    wherein the second temperature is between 150 and 290 degrees Celsius, and
    wherein the time period of the overaging is between 20 and 28 hours.

24. The method of claim 1, wherein the solution aging is one of a plurality of solution aging steps performed before the overaging, wherein each of the solution aging steps comprises solution aging the A205 aluminum alloy component, the A205 aluminum alloy component being cooled between every two of the plurality of the solution aging steps.

25. The method of claim 24, wherein the plurality of solution aging steps are performed at the same temperature.

26. The method of claim 24, wherein each of the solution aging steps is performed at a temperature of 400 to 700 degrees Celsius.

27. The method of claim 24, wherein a sum of time periods of the solution aging steps is less than five hours.

28. The method of claim 24, wherein the plurality of solution aging steps are two solution aging steps of two hours each.

29. The method of claim 24, wherein the A205 aluminum alloy component is cooled between every two of the plurality of the solution aging steps to a temperature of at most 52 degrees Celsius.

* * * * *